Patented Dec. 1, 1931

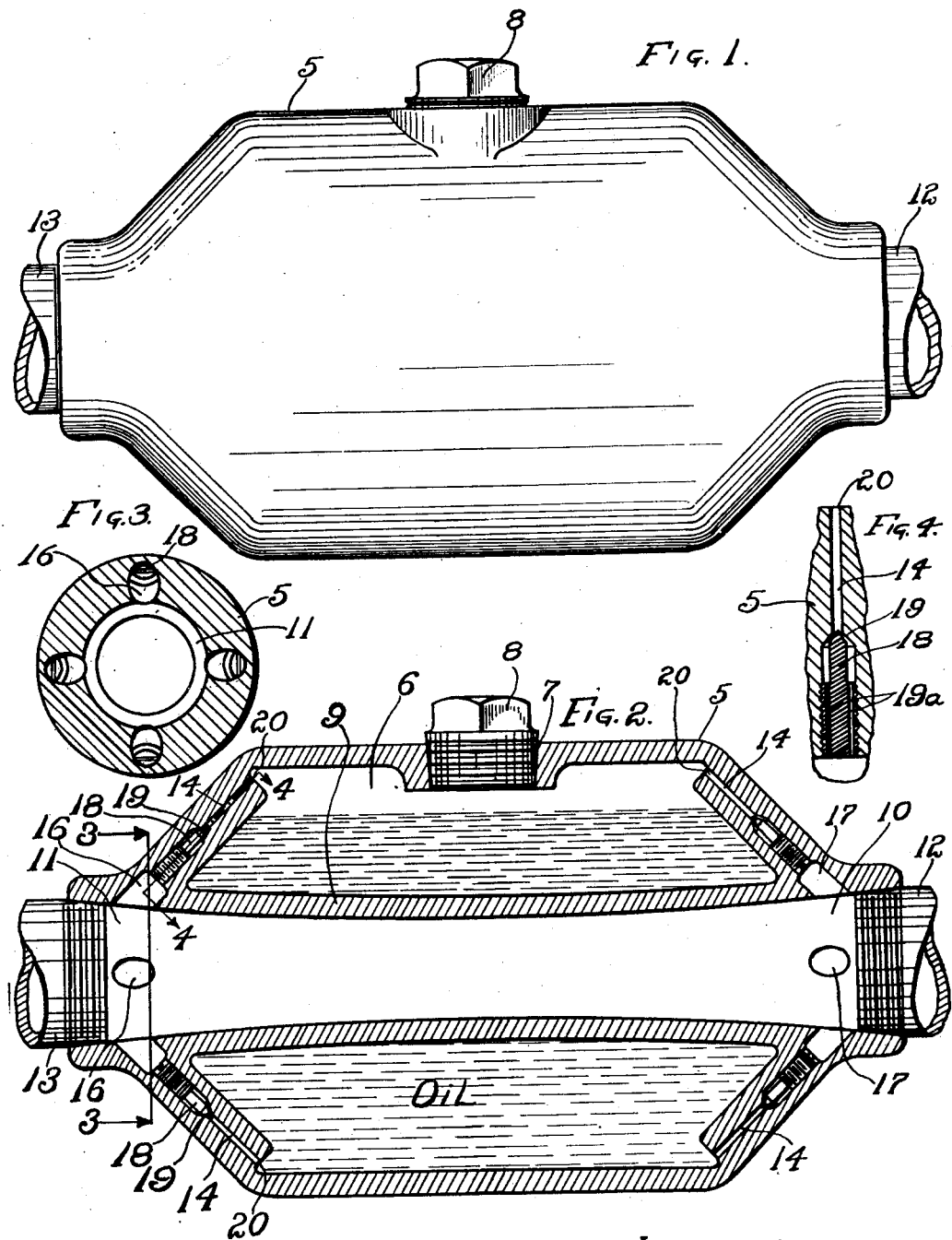

1,834,172

UNITED STATES PATENT OFFICE

ROBERT C. OSGOOD, OF CLAREMONT, NEW HAMPSHIRE, ASSIGNOR TO SULLIVAN MACHINERY COMPANY, A CORPORATION OF MASSACHUSETTS

LUBRICATING DEVICE

Application filed November 29, 1929. Serial No. 410,564.

My invention relates to lubrication of mechanisms actuated by fluid pressure. More particularly my invention relates to a lubricating device which may be inserted in the line supplying fluid under pressure to mechanisms which are to be actuated by the pressure fluid.

One object of my invention is to provide improved lubricating means which supplies lubricant only so long as fluid is flowing through the same to the mechanisms which are being actuated. A further object of my invention is to provide an improved lubricating device which may operate, irrespective of which side of the device is placed uppermost. A still further object of my invention is to provide an improved lubricating device which takes advantage of the flow of fluid through the device to produce a differential pressure, as with the well known Pitot tube, and employs this differential pressure for the automatic feed of lubricant into the passageway for the flowing fluid. Further objects of my invention will become apparent in the course of the ensuing description and will be more particularly pointed out in the accompanying claims.

For purposes of illustration I have shown in the drawings one embodiment which my invention may assume; and in the drawings which disclose this illustrative embodiment—

Fig. 1 is a view of the outside of the device.

Fig. 2 is a sectional view through the axis of the device.

Fig. 3 is a transverse section on line 3—3 of Fig. 2.

Fig. 4 is a detailed view in section on the line 4—4 of Fig. 2.

Fig. 1 may be considered a plan view, or an elevational view, as the casing of the device is substantially cylindrical; and no one side is the top or the bottom.

The body member 5 is hollow, so as to provide a chamber 6 for containing the lubricant, which may be oil or other suitable material. This lubricant may be placed in the chamber 6 through an opening 7, normally closed by a suitable plug 8. A conduit member 9 extends through the chamber 6; and in the present embodiment is shown as being formed integral with the body member 5. If, as shown in the present embodiment, the body member 5 is substantially cylindrical, the conduit member 9 may be arranged on the same axis as the axis of the body member 5. Each end of the device is provided with a chamber; inasmuch as my device is symmetrical and is equally efficient with flow of fluid through the conduit member 9 in either direction. The chamber at the right end of the device is numbered 10 and the chamber at the left end of the device is numbered 11. The two outer ends of the two chambers are shown as opening into pipes 12 and 13, the connections between the pipes and the walls surrounding the chambers 10 and 11 being each a threaded connection.

A plurality of passages 14 connect the chamber 11 with the chamber 6. These passages 14 may be formed in a separate member, but, as shown, the end wall of the body member 5 is thickened; and each passage 14 extends within the thickened wall. The inner ends of passages 14 are enlarged, as at 16, 17. It is my purpose to cause the flow of fluid through the conduit member to either increase or decrease the pressure of the fluid at the enlarged ports 16 of the passages 14, depending upon whether the chamber 11 be the inlet or the outlet chamber. In order to obtain a Pitot tube action, the ports 16 are formed to cup moving fluid when the chamber 11 is the inlet, and to cause an aspirating action when the chamber 11 is the outlet. The enlarged ports 16 face somewhat toward the pipe 13; in other words, if a plane be passed through the chamber 11, so that the axis of the conduit member 9 is perpendicular thereto, the axis of each port 16 would be angularly disposed with respect to such a plane. The pressure differential can be varied by modifying the walls of the chambers 10 and 11 adjacent the ports 17 and 16; since the more the lip of a port extends into the stream of fluid passing along the conduit member 9, the more will the port cup the moving fluid and the greater will be the resultant pressure differential.

As a simple means for controlling the amount of lubricant supplied to the flowing fluid, I may provide adjustable valve mechanism. If the passages 14 at one end of the device be valve controlled, the flow of lubricant will be controlled; but for more perfect results, I prefer to provide the passages 14 at both ends with valve mechanism. In the preferred embodiment of my invention the flow of fluid through each passage 14 is controlled by an adjustable throttle valve 18 cooperating with a valve seat 19 surrounding a contracted portion of the respective passage 14. The valves 18 each have longitudinal passages 19a extending therethrough, as shown in Fig. 4, for the passage of fluid past the body of the valve.

I have above explained that the device may be turned around end for end; and that it will then operate with equal efficiency. This is due to the fact that a corresponding set of passages 14 surround the other end of the conduit member 9, and open through enlarged ports 17 into the chamber 10. The passages 14 at the left end of the device have their mouths 20 distributed substantially equally about the conduit member 9. The same is true with respect to the mouths 20 of the passages 14 at the right end of the device. This arrangement insures that one mouth 20 at each end will always be below the level of the axis of the conduit member 9, no matter how the body member 5 be laid on the ground. This makes it possible to use my improved lubricating device without paying any attention to which side is uppermost.

The flow of fluid through the conduit member 9 from one pipe to the other causes a difference of pressure in a port 16 or 17 at the inlet end from the pressure in a port 16 or 17 at the outlet end, so long as fluid is flowing through the conduit member 9, in accordance with the principles of the well known Pitot tube. Due to this difference in pressure, oil is forced out through a passage 14, through passages 19a in the valve, and one or more of the port 16 or 17 at the outlet end; and the fluid flowing along carries with it the lubricant, which has thus been fed into the chamber 10 or 11.

I have designed my device with four passages 14 at each end, but it is obvious that a greater or less number of passages may be employed, a larger size conduit member 9 making a larger number of passages 14 preferable.

It is obvious that my improved lubricating device has numerous advantages over lubricating devices heretofore known to the art, among these advantages being the capability, which my device has, of being used with either end as the outlet end, and the further capability of operating, no matter which side is placed uppermost.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. An oiling device for flowing gases comprising a hollow body member, a conduit member extending through the chamber in said body member, and means providing a plurality of passages connecting said chamber with the passage afforded by said conduit member for the flow of fluid and communicating with the chamber at points most remote from the conduit member, a plurality of said connecting passages opening into the passage afforded by said conduit member through ports facing generally in one direction relative to the axis of said conduit member and others of said connecting passages opening into the passage afforded by said conduit member through ports facing generally in the opposite direction relative to the axis of said conduit member.

2. An oiling device comprising a chambered body member, a conduit member extending through the chamber in said body member for conducting fluid through said body member, means adjacent one end of said conduit member providing a plurality of passages connecting said chamber with the passage afforded by said conduit member and communicating with the chamber at points most remote from the conduit member, and means adjacent the other end of said conduit member providing a plurality of passages connecting said chamber with the passage afforded by said conduit member, the connecting passages opening into the passage afforded by said conduit member through ports disposed with their axes at angles to a plane relative to which the axis of said conduit member is perpendicular, the axes of the ports at one end being generally inclined in one direction relative to the axis of said conduit member, and the axes of the ports at the other end being generally inclined in the opposite direction relative to the axis of said conduit member.

3. An oiling device comprising a chambered body member, a conduit member extending through the chamber in said body member for conducting fluid through said body member, means adjacent one end of said conduit member formed with a plurality of ports disposed with their axes at angles to a plane relative to which the axis of said conduit member is perpendicular, said ports being connected by passages with said chamber and said passages communicating with the chamber at points most remote from the conduit member, the mouths of said passages being substantially equally distributed about the axis of said conduit member, and means adjacent the other end of said conduit member formed with a plurality of ports disposed with their axes at angles to said plane, said last mentioned ports being connected by passages with said chamber, the mouths of said last mentioned passages being substantially equally distributed about the axis of said conduit member.

4. An oiling device comprising a chambered body member, a conduit member extending through the chamber in said body member for conducting fluid through said body member, said conduit member being provided at its ends with means forming at each end a plurality of ports, each port being shaped to cup fluid passing along said conduit member toward the opposite end, and means at each end of said conduit member providing passages, each port being connected by a passage with said chamber and the latter passages communicating with the chamber at points most remote from the conduit member.

5. An oiling device comprising a chambered body member, a conduit member extending through the chamber in said body member for conducting fluid through said body member, said conduit member being provided with means at an end forming a plurality of ports, each port being shaped to cup fluid passing along said conduit member toward the other end of said device, means providing passages connecting said ports with said chamber and the passages communicating with the chamber at points most remote from the conduit member, adjustable valve means controlling said passages, said conduit member being provided at its other end with means forming a plurality of ports, each port being shaped to cup fluid and facing generally in the opposite direction from said first mentioned ports, and means providing passages, connecting said last mentioned ports with said chamber.

6. An oiling device comprising a chambered body member, a conduit member extending through the chamber in said body member for conducting fluid through said body member, said conduit member being provided at its ends with means forming at each end a plurality of ports, each port being shaped to cup fluid passing along said conduit member toward the opposite end, means at each end of said conduit member providing passages, each port being connected by a passage with said chamber and the passages communicating with the chamber at points most remote from the conduit member, and adjustable valve means in said passages controlling flow therethrough.

7. An air line oiler comprising a hollow body member having a chamber forming an oil reservoir, a conduit member extending centrally through the oil reservoir for conducting pressure fluid through the body member, and means for supplying lubricant from said reservoir to the passage in said conduit member including oil conducting passages formed in said body member and connecting the opposite ends of the conduit passage with the reservoir and communicating with the reservoir at points most remote from the conduit member.

8. An air line oiler comprising a hollow body member having a chamber forming an oil reservoir, a conduit member extending centrally through the oil reservoir for conducting pressure fluid through the body member, means for supplying lubricant from said reservoir to the passage in said conduit member including oil conducting passages formed in said body member and connecting the opposite ends of the passage in the conduit member with the reservoir and communicating with the reservoir at points most remote from the conduit member, and a needle valve for controlling each oil conducting passage.

9. An air line oiler comprising a hollow cylindrical body member having a chamber forming an oil reservoir, a conduit member extending centrally through the oil reservoir for conducting pressure fluid through the body member, and means for supplying lubricant from said reservoir to the passage in said conduit member including oil passages formed in said body member and connecting the reservoir with the passage in the conduit member, said passages communicating with the reservoir at points most remote from the conduit member so that oil may be supplied from the reservoir to the passage in the conduit member irrespective of the position of the body member about its longitudinal axis.

10. An air line oiler comprising a hollow cylindrical body member having a chamber forming an oil reservoir, a conduit member extending centrally through the oil reservoir for conducting pressure fluid through the body member, means for supplying lubricant from said reservoir to the passage in said conduit member including oil passages formed in said body member and connecting the reservoir with the passage in the conduit member, said passages communicating with the reservoir at points most remote from the conduit member so that oil may be supplied from the reservoir to the passage in the conduit member irrespective of the position of the body member about its longitudinal axis, and a needle valve for controlling each oil conducting passage.

11. An air line oiler comprising a hollow body member having a chamber forming an oil reservoir, a conduit member extending centrally through the oil reservoir, said body member having end openings communicating with the passage in the conduit member, and means for supplying oil from the reservoir to the passage in the conduit member including oil conducting passages and valves controlling said passages, said valves being so arranged with respect to the end openings in the body member that access to the same may be had through the openings to permit adjustment thereof.

In testimony whereof I affix my signature.

ROBERT C. OSGOOD.